United States Patent [19]

Blanding et al.

[11] 4,118,456
[45] Oct. 3, 1978

[54] EXTRUSION DIE

[75] Inventors: Wendell S. Blanding, Painted Post; Robert V. Van Dewoestine, Corning, both of N.Y.

[73] Assignee: Corning Glass Works, Corning, N.Y.

[21] Appl. No.: 808,153

[22] Filed: Jun. 20, 1977

[51] Int. Cl.² ............................................. B29F 3/00
[52] U.S. Cl. .................. 264/177 R; 264/209; 425/464
[58] Field of Search ............ 264/177 R, 167, 209; 425/463, 464

[56] References Cited
U.S. PATENT DOCUMENTS

| 3,016,568 | 1/1962 | Gagne | 425/464 |
|---|---|---|---|
| 3,790,654 | 2/1974 | Bagley | 264/177 R |
| 3,846,197 | 11/1974 | Wiley | 425/464 |
| 3,887,741 | 6/1975 | Dwyer | 264/177 R |
| 3,899,326 | 8/1975 | Frost et al. | 264/177 R |
| 3,919,384 | 11/1975 | Contaloupe et al. | 264/177 R |
| 3,981,657 | 9/1976 | Orso et al. | 425/464 |
| 3,983,283 | 9/1976 | Bagley | 264/177 R |

Primary Examiner—Jeffery R. Thurlow
Attorney, Agent, or Firm—Burton R. Turner; Clarence R. Patty, Jr.

[57] ABSTRACT

An extrusion die for forming a honeycomb structure having a plurality of interconnected discharge slots provided with a plurality of relatively small sized feed holes directly communicating with intersecting portions of said discharge slots, and a plurality of relatively larger feed passageways each communicating with a plurality of said relatively small sized feed holes, with said feed holes and feed passageways extending longitudinally of said die and the flow through said die such that a portion of such flow may pass directly through such die in a linear path.

9 Claims, 10 Drawing Figures

EXTRUSION DIE

BACKGROUND OF THE INVENTION

In the past it has been customary to form extrusion dies for forming thin-walled honeycombed structures from a solid die body by saw-cutting discharge slots in the outlet face of the die body, and drilling rather lengthly feed holes into the inlet face of the die body so as to communicate with such discharge slots, in a manner shown in U.S. Pat. No. 3,790,654 to Bagley. As further shown in the Bagley patent, the feed holes may communicate with each intersecting slot or every other intersection, as desired, however, in both cases the feed holes extend a substantial distance through a unitary die body.

In order for the extruded material to coalesce within the discharge slots into a unitary grid or matrix prior to being extruded from the outlet face of the die, it is necessary that the slots either be of sufficient length so that the extruded material will have time to flow transversely within slots to knit into a unitary grid prior to being longitudinally discharges from the outlet face of the die, or else additional feed holes must be provided in communication with the slot gridwork in order to reduce the amount of transverse flow required to provide such a unitary cellular matrix therewithin and prior to discharge from the die face.

However, since the ceramic material extruded through such dies is rather abrasive, it is necessary to utilize a high quality steel which gives extended life and which is resistant to wear caused by such abrasion. Accordingly, it is extremely difficult to machine such steel into a gridwork of slots and still maintain the necessary tolerances required to produce a honeycomb structure having a cellular density up to 300 cells per square inch with wall thicknesses of 0.01 inches or less. Therefore, the depth of the slots which can reasonably be formed while maintaining the necessary tolerances is limited to about 0.2 inches, depending upon the material of the die utilized.

Further, it has been extremely difficult to drill the rather extended feed holes through the unitary die body so that they perfectly register and communicate with the intersections of the discharge slots, not only due to the high quality wear resistance steel which must be utilized, but also due to the extended length that is required. The length of the feed holes, of course, is governed by the thickness of the unitary die body, and the thickness of the unitary die body is dictated by the strength of the die required in order to withstand the high extrusion pressures required, which may reach as high as 3000-3500 psi. In addition, it will be recognized that the diameter of the holes which may be utilized is also severely limited by the structural strength requirements of the die, for if the diameter is increased extensively to provide material to a greater area of the discharge slot gridwork, the die would become an extremely weak cellular construction which could not withstand the required extrusion pressures. Therefore, the size of the feed holes as measured by their diameter, was severely limited by the structural strength requirements of the die, which in turn only permitted the use of rather small diameter feed holes resulting in excessive pressure drops in the flow and necessitating unduly large operating pressures.

Whereas the feed holes of the die of Bagley substantially overlapped the intersections of the discharge slots and terminated in abuttment with portions of the die pins between such slots, U.S. Pat. No. 3,846,197 to Wiley suggests the use of a transition or distributor area at the lower end of the feed holes for directing the flow in a pattern similar to the intersection of the discharge slots. That is, each feed hole is provided with its own distributor zone which functions to funnel the extrudable material into the slot opening at the intersections thereof rather than into abuttment with portions of the pins adjacent the slots, resulting in improved transverse flow of the extruded material. However, the die of Wiley is plagued with the same limitations as the die of Bagley, in that the maximum hole size is severely limited by structural and strength requirements of the die, and accordingly pressure drop in the restricted feed holes is a major consideration requiring fairly large operating pressures.

Accordingly, the present invention has overcome the problems of limited feed hole size, high pressure drop and loss of die strength, by providing a completely unique manner of forming an extrusion die with a plurality of relatively large diameter feed passageways which may be of extended length, each feeding a plurality of smaller diameter passageways or feed holes of limited length which directly communicate with intersections of a slotted discharge gridwork.

SUMMARY OF THE INVENTION

In its very simplest form, the present invention is directed to an improved extrusion die structure for forming thin-walled cellular or honeycombed structures and to the method of forming such structures. Cellular or honeycomb structures refer to any structure having a plurality of openings or passages of any desired size or shape extending therethrough, wherein thin walls refer to the walls between such openings or passages having a thickness of between about 0.002" and 0.050". The extrusion die per se is preferably formed of at least two sheets or discs of suitable materials such as metal which are preformed in a manner to be described and then joined or bonded together, such as by brazing into a unitary body. The discs may include an inlet or feed hole body member and a discharge body member, with the discharge member having a plurality of interconnected discharge slots which provide uniform openings in the outlet face of the die. The discharge slots may either be uniformly spaced-apart or formed with variable spacings therebetween if desired, and the gridwork formed in the outlet face by such slots may be of virtually any geometric pattern such as square, rectangular, triangular, hexagonal and circular. A plurality of small sized feed holes or openings are formed in the discharge body member and communicate between an inlet face, opposite said outlet face, and inner root portions of the discharge slots, to deliver extrudable material supplied thereto to intersecting portions of the discharge slots. The feed openings formed in the discharge body are preferably not only formed with a minimum length, but also are of a relatively small diameter and directly communicate with selected intersecting portions of the gridwork formed by the interconnecting discharge slots.

The discharge slots, which are of a predetermined size and orientation to form a desired thin-walled structure, extend inwardly from the outlet face a distance sufficient to insure the lateral filling of such slots with the extrudable material delivered thereto by the feed holes, prior to such material being discharged from the die. The slots provide sufficient resistance to flow to insure that the batch material will flow laterally together within the depth of the discharge slots prior to being discharged therefrom, so as to form a continuous mass of interconnected batch prior to such discharge.

The inlet or feed hole body member is provided with a plurality of feed passageways extending completely therethrough of a substantially larger diameter than the diameter of the feed holes or openings formed in the discharge body member. The feed passageways are so positioned in their longitudinal orientation through the feed hole body member such that when the discharge body member and feed hole body member are assembled together, the feed passageways of the feed hole body member communicate with a plurality of the feed openings formed in the inlet face of the discharge body member. Accordinaly, it is possible to form a plurality of rather short and precisely oriented feed openings in the discharge body member which communicate with selected intersecting portions of the discharge slots, and supply extrudable material to such precisely formed feed openings of limited diameter with relatively large diameter feed passageways formed in the inlet or feed hole body member, while maintaining a high structural integrity of the composite die and limiting undesirable pressure drop.

It thus has been an object of the present invention to provide a novel relatively easily manufacturable extrusion die for forming thin-walled honeycomb articles having a plurality of openings per cross sectional area, wherein said die structure is substantially rigid so as to maintain dimensional stability during extrusion and thereby provide uniform walls between such openings.

A further object of the invention has been to provide an improved method of forming a die for producing thin-walled honeycombed articles by forming discharge slots in one face of a first body member and relatively small feed holes in the opposite face of such body member which communicate with intersecting portions of said slots, forming a plurality of relatively large feed passageways entirely through a second body member and joining said first and second body members together in such a fashion so that each of said plurality of relatively large feed passageways communicates with a plurality of said relatively small feed holes.

BRIEF DESCRIPTION OF THE DRAWINGS

FIGS. 8-10 set forth a still further embodiment of the invention wherein FIGS. 8, 9 and 10 are similar to FIGS. 3, 4 and 5, respectively, with the exception that FIG. 8 illustrates a discharge body member with a feed hole for each intersecting slot rather than every other intersection as shown in FIG. 3.

FIG. 9 illustrates the positionment of the feed passageways of an inlet or feed hole body member for feeding the feed holes of FIG. 8.

FIG. 10 is a plan view of a portion of the inlet face of the die embodiment formed with the body members of FIGS. 8 and 9.

DESCRIPTION OF THE PREFERRED EMBODIMENTS

Figure 1:
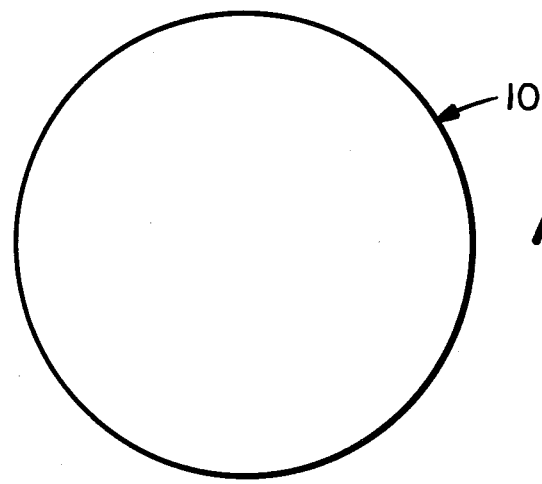
FIG. 1 is a somewhat schematic plan view of an extrusion die, with the details of the openings formed therethrough being omitted for purposes of simplicity.
Figure 2:
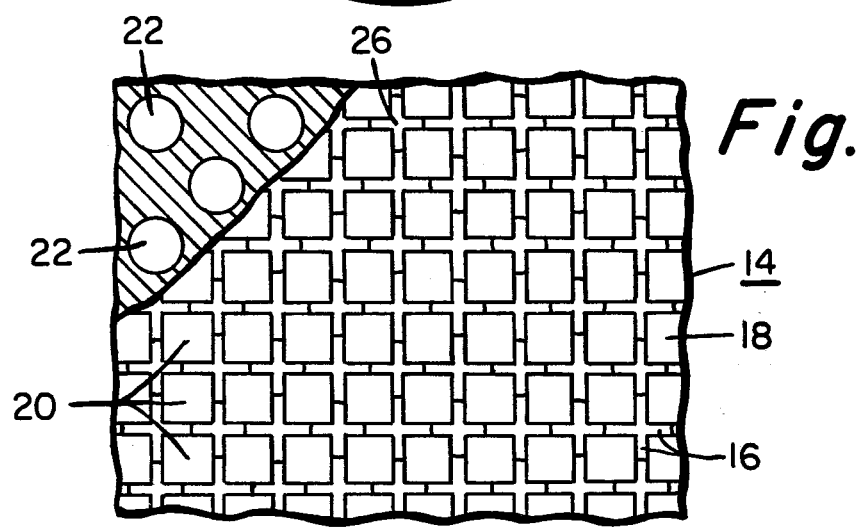
FIG. 2 is a fragmental plan view in enlarged scale of the outlet face of the discharge body member forming a portion of the die of FIG. 1, with a corner portion broken away to show the feed holes formed in the opposite inlet face.
Figure 3:
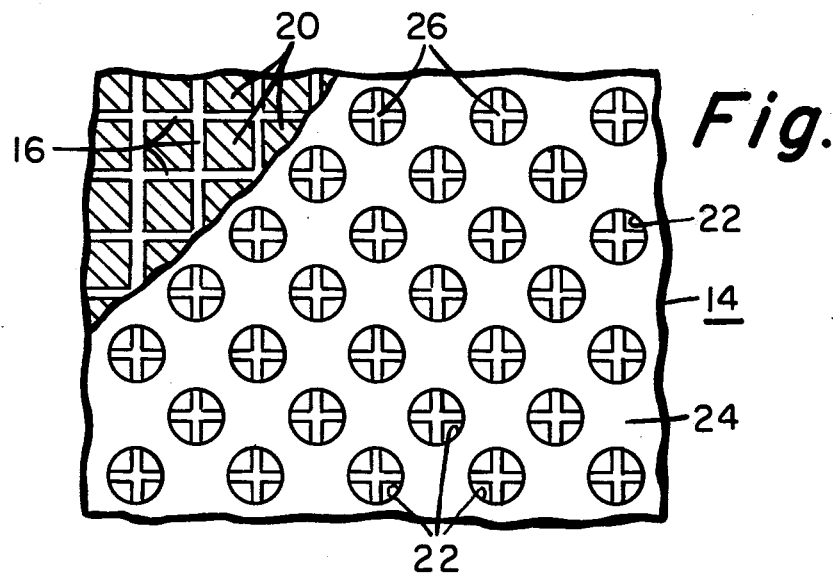
FIG. 3 is a fragmental plan view of the inlet face of the discharge body member shown in FIG. 2, with a corner portion broken away to show the discharge slots formed in the opposite outlet face.
Figure 6:
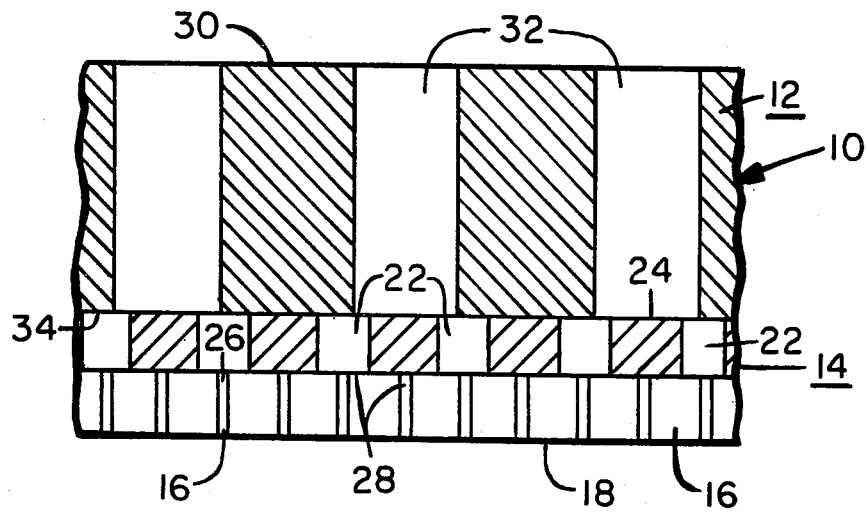
FIG. 6 is an elevational view in section taken along line 6—6 of the die fragment shown in FIG. 5.

Referring now to the drawings, and particularly FIGS. 1-3, an extrusion die 10, which may be of a circular or disc configuration, is comprised of an inlet or feed hole body member 12 and an outlet or discharge body member 14 (see also FIG. 6). As shown particularly in FIGS. 2 and 3, the outlet or discharge die body 14 has a plurality of interconnected discharge slots 16 formed in an outlet face 18 which provide a gridwork of such slots for extruding a honeycomb structure. The bounding walls of the discharge slots 16 are formed by the sidewall portions of pins 20, formed intermediate said discharge slots 16 in the discharge body member 14 adjacent the outlet face 18. A plurality of relatively small-sized feed holes 22 are formed in the inlet face 24 of the discharge body member 14 and communicate with selected intersecting portions 26 of the discharge slots 16. As shown in FIG. 6, the feed holes 22 communicate with inner root portions 28 of the discharge slots 16 at intersecting portions 26 of such slots to facilitate the flow of extrudable material.

Figure 4:
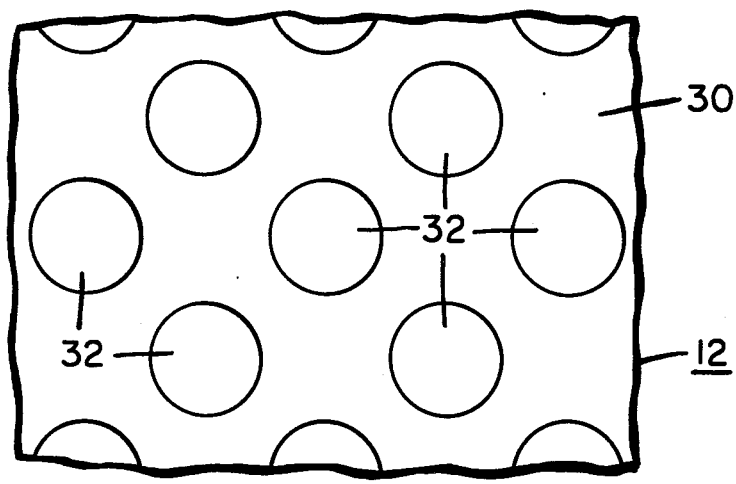
FIG. 4 is a fragmental plan view, on the same scale as FIGS. 2 and 3, of an inlet or feed hole body member forming a portion of the die of FIG. 1, showing a plurality of feed passageways extending therethrough.
Figure 5:
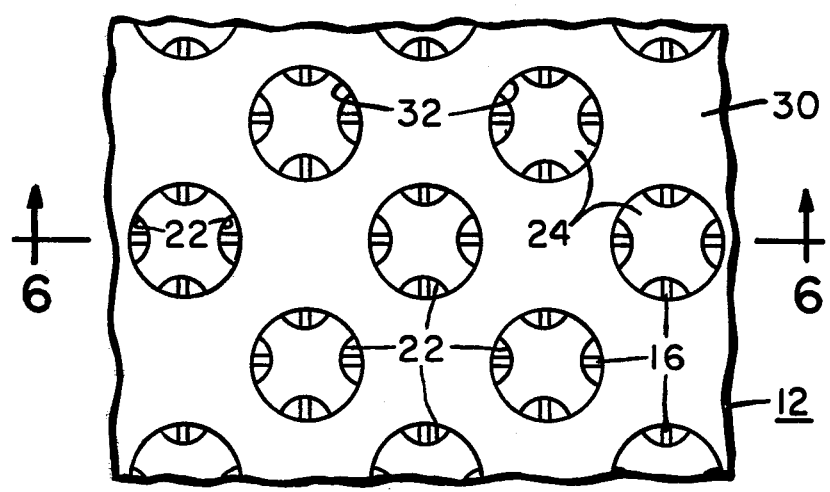
FIG. 5 is a fragmental plan view, on the same scale as FIGS. 2-4, of the inlet side of the die shown in FIG. 1.

The inlet or feed hole body member 12 of the extrusion die 10, as shown in FIGS. 4 and 6, includes a plurality of relatively larger size feed passageways 32 which extend through the body member 12 between its entrance face 30 and exit face 34. The feed passageways 32 are of a relatively larger size diameter than the relatively smaller diameter feed holes 22, such that each feed passageway 32 communicates with a plurality of feed holes 22. As shown in FIG. 5, each feed passageway 32 is large enough to communicate with four feed holes 22, which in turn communicate with the interconnected discharge slots 16 at selected intersecting portions 26, such that a portion of the batch may flow lineraly through the axial extent of the die.

Figure 7:
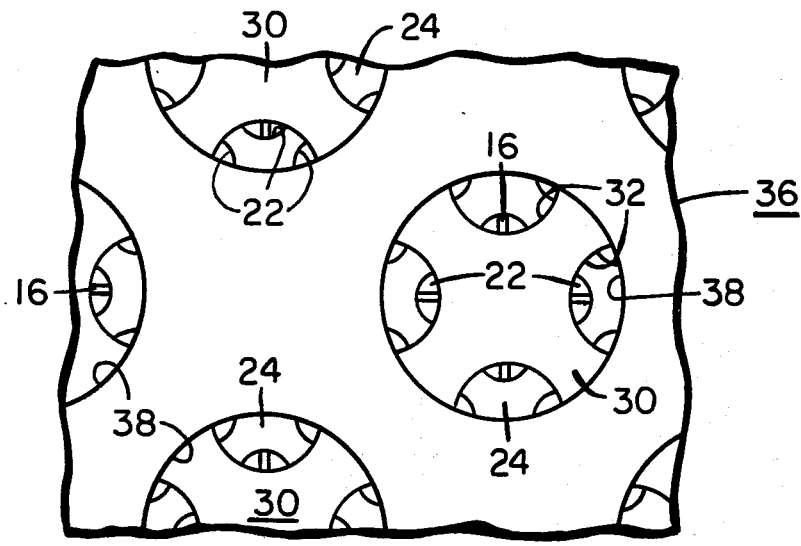
FIG. 7 is a plan view of a further embodiment of the invention, similar to FIG. 5, but with the addition of a second inlet or feed hole body member having a plurality of much larger feed passageways for feeding the relatively large passageways shown in FIG. 5.

FIG. 7 illustrates a further embodiment wherein a second or additional inlet body member 36, having a plurality of extra large diameter feed passageways 38 extending therethrough, is positioned upon entrance face 30 of inlet body member 12 so that each large feed passageway 38 commmunicates with four feed passageways 32 of inlet body member 12. Thus, the additional inlet body member 36 illustrates that the concept of feeding a plurality of smaller feed passageways with a larger passageway, may be extended as desired. That is, as shown in FIG. 7, extra large diameter feed passageways 38 each feed a plurality of four large diameter feed passageways 32, which in turn feed a plurality of small diameter feed holes 22, which directly communicate with interconnected discharge slots 16 at intersections 26.

Figure 8:
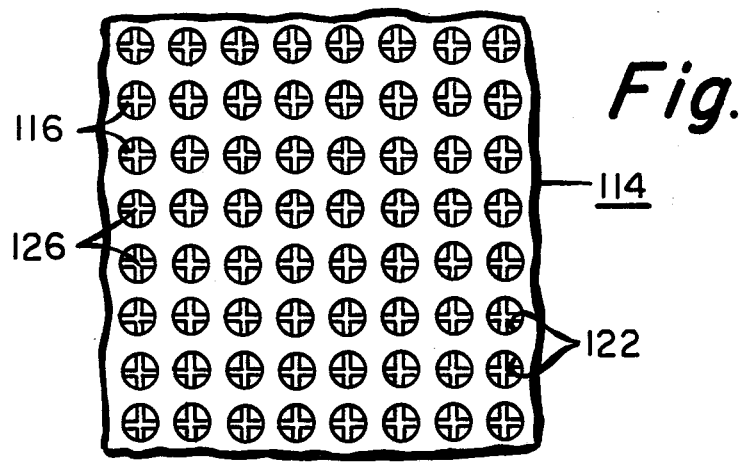
Figure 9:
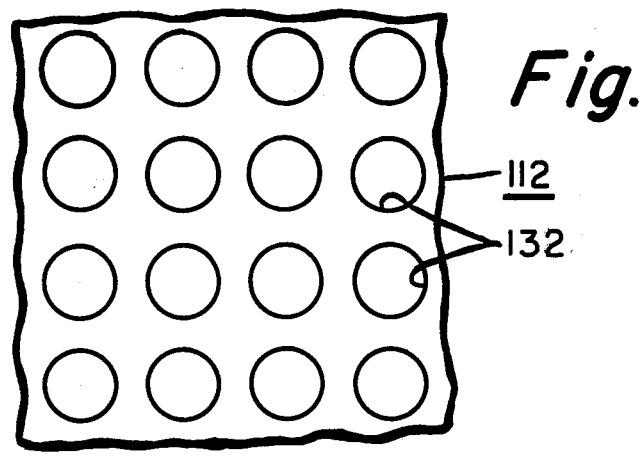
Figure 10:
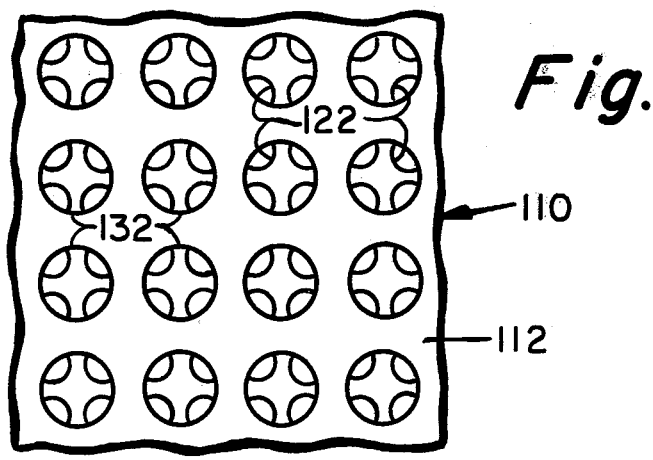

A further embodiment of the present invention is shown in FIGS. 8, 9 and 10, wherein an outlet or discharge body member 114 is provided with a feed hole 122 for each intersecting portion 126 of the interconnected discharge slots 116. The inlet or feed hole body member 112 is provided with a plurality of feed passageways 132 which extend therethrough. As shown in FIG. 10, when the inlet body member 112 is assembled over the outlet body member 114 to form the extrusion die 110, the feed passageways 132 communicate with a plurality of four feed holes 122, which in turn each directly communicate with an intersecting portion 126 of the interconnected discharge slots 116 (not shown in FIG. 10 for purposes of clarity). Thus, by utilizing the present invention, it is possible to provide a feed hole at each intersecting slot and supply batch material thereto so as to insure the knitting or coalescing of the batch material into a unitary cellular structure prior to being discharged from such slots, without increasing back pressure in the feed passageways and while maintaining the structural integrity and die strength necessary to withstand the extrusion pressures.

That is, in the past when individual holes were attempted to be provided at each intersecting slot, they necessarily had to be of a rather small diameter so that they would not overlap and so that there would be sufficient material remaining in the die to provide strength to the die pins, but accordingly the back pressure in such relatively small feed holes became extremely high and prevented economical extrusion. Further, when larger holes were attempted to be utilized, the strength of the die became materially weakened which precluded the use of higher pressures which tended to result in distortion or failure of the die. Thus, with the present invention relatively short and small diameter feed holes may communicate with each intersecting slot and be fed by longer, larger diameter feed passageways, thereby eliminating the strength and pressure drop problems encountered in the past.

Although it will be appreciated that the size and configuration of the die utilized may vary as desired without affecting the novel concept of feeding the batch material through the die as set forth herein, the following specific illustration is merely provided as one preferred embodiment and is by no means limiting in nature. A 6 inch die having 277 square shaped cells per square inch, was formed with an inlet or feed hole body member and an outlet or discharge body member both formed of a wear resistant low carbon steel known as EZ CUT 20. The inlet body member had a thickness of about 0.85" and an overall diameter of about 9" formed with about 9200 feed passageways of a diameter of 0.086" and drilled therethrough on a 0.120" centerline. The outlet or discharge body member had an overall diameter of about 9" and a 6.5" central area having a thickness of about 0.35". A plurality of 0.01" wide intersecting slots were saw cut into the outlet face of the discharge body member on 0.06" centerlines, thus producing square pins therebetween having 0.05" walls. The slots were formed with a depth of about 0.175" into the outlet face of the discharge die body. A plurality of about 2300 feed holes were drilled into the inlet face of the die body a distance of about 0.190" with a diameter of about 0.043" on 0.06" centerlines so as to directly communicate with each intersection of said interconnected discharge slots. Thus, with the inlet body member secured to the outlet body member by brazing, each feed pasageway formed in the inlet body member communicated with four feed holes formed in the discharge body member which in turn communicated with the intersections of the interconnected discharge slots. Such construction, wherein a small feed hole is positioned behind and directly communicates with each slot intersection, and a large feed passageway is formed behind a plurality of such small feed holes, requires between about 500-600 psi less pressure to produce a good extrusion than where a conventional straight-through small feed hole design is utilized.

The use of feed holes with increased size can be employed in structures other than square celled structures. That is, in a die utilized to make hexagonal extrusions, a double sized hole can be positioned to feed three smaller sized holes. Although not absolutely necessary, it is preferred for ease of assembly and flow of matrial that the larger or inlet feed passageway size be double the diameter of the smaller feed holes or passageways to which such larger passageway supplies material. That is, the larger holes must have a diameter which is at least 1.414 times bigger than the diameter of the smaller holes, or there will be no decrease in impedance to flow due to the feed holes. If the diameter of the large holes is bigger than about 2.5 times the diameter of the small hole, however, the structure will most likely be too weak to be effective, since it will not be able to withstand the necessary extrusion pressures.

Although we have disclosed the now preferred embodiments of our invention, it will be apparent to those skilled in the art that various changes and modifications may be made thereto without departing from the spirit and scope thereof as defined in the appended claims.

We claim:

1. An extrusion die for forming honeycomb structures comprising, a first body member having an inlet face and an outlet face, a plurality of interconnected discharge slots formed in said first body member and communicating with said outlet face, a plurality of relatively short feed holes of limited diameter formed in said body member and communicating between selected intersecting portions of said interconnected discharge slots and said inlet face, a second body member having an entrance face and an exit face, a plurality of relatively long, individual, spaced-apart feed passageways extending through said second body member between said entrance face and said exit face of a diameter larger than the diameter of said relatively short feed holes formed in said first body member, said first and second body members being joined together with the exit face of said second body member adjacent the inlet face of said first body member to form an integral extrusion die, and each of said individual feed passageways formed through said second body member directly communicating with a plurality of said feed holes formed in said first body member which in turn communicate with selected intersecting portions of said interconnected discharge slots.

2. An extrusion die as defined in claim 1 wherein said individual feed passageways each have a diameter at least 1.414 times the diameter of the feed holes in communication therewith formed in said first body member so as to decrease impedance to the flow of material therethrough over the impedance which would be obtained where the feed holes continued through the depth of said second body member.

3. An extrusion die as defined in claim 1 wherein each of said feed passageways extending through said second body member communicates directly with a plurality of at least three of said feed holes formed in said first body member.

4. An extrusion die as defined in claim 1 wherein a third body member having a plurality of additional feed passageways extending therethrough of larger diameter than the diameter of the feed passageways extending through said second body member is joined to the entrance face of said second body member, and each of said additional feed passageways formed through said third body member directly communicates with a plurality of the feed passageways extending through said second body member.

5. An extrusion die as defined in claim 1 wherein said feed holes formed in the inlet face of said first body member communicate with root portions of said interconnected discharge slots adjacent each intersection of said slots.

6. A method of extruding a honeycomb structure having thin wall portions not exceeding about 0.05" which comprises, providing extrudable batch material to the inlet end of a plurality of relatively long, individual, spaced-apart feed passageways having relatively large diameters, longitudinally flowing for a relatively long distance such batch material through said relatively large diameter feed passageways, flowing such batch material from each of said relatively large individual feed passageways directly into a plurality of relatively short and relatively small diameter feed holes, continuing the longitudinal flow of such batch material for a relatively short distance through said relatively small diameter feed holes to the intersections of a plurality of interconnected discharge slots, simultaneously flowing such batch material transversely between the intersections of such slots to form a coalesced gridwork-like mass of such material and longitudinally of such slots before discharging said gridwork-like mass from said slots, and discharging such mass from said slots to form a cellular honeycomb structure.

7. A method of extruding a honeycomb structure as defined in claim 6 wherein the cross sectional flow of material through each of said feed passageways is at least 1.414 times the cross sectional flow through each of said feed holes so as to reduce the impedance to flow in the composite flow.

8. A method of extruding honeycomb structures as defined in claim 6 including the step of dividing the flow from each of said feed passageways into at least three feed hole flows.

9. A method of extruding honeycomb structures as defined in claim 6 including the step of flowing a portion of the batch material linearly through the feed passageway, feed holes and discharge slots.

* * * * *